US012645626B2

(12) United States Patent
Liao et al.

(10) Patent No.: US 12,645,626 B2
(45) Date of Patent: Jun. 2, 2026

(54) REMOTE MAINTENANCE SYSTEM AND OPERATION METHOD THEREOF

(71) Applicants:Chih-Pin Liao, Taoyuan City (TW); Yao-Te Fang, Hsinchu City (TW)

(72) Inventors: Chih-Pin Liao, Taoyuan City (TW); Yao-Te Fang, Hsinchu City (TW)

(73) Assignee: ITE Tech. Inc., Hsinchu (TW)

( * ) Notice: Subject to any disclaimer, the term of this patent is extended or adjusted under 35 U.S.C. 154(b) by 104 days.

(21) Appl. No.: 18/528,824

(22) Filed: Dec. 5, 2023

(65) Prior Publication Data

US 2025/0045225 A1     Feb. 6, 2025

(30) Foreign Application Priority Data

Aug. 2, 2023     (TW) ................................. 112129016

(51) Int. Cl.
| | |
|---|---|
| *G06F 13/362* | (2006.01) |
| *G06F 11/07* | (2006.01) |
| *G06F 13/42* | (2006.01) |
| *G06Q 10/20* | (2023.01) |

(52) U.S. Cl.
CPC ........ *G06F 13/362* (2013.01); *G06F 13/4282* (2013.01); *G06F 2211/005* (2013.01)

(58) Field of Classification Search
CPC ............... G06F 13/362; G06F 13/4282; G06F 2211/005; G06F 11/0778; G06F 11/0793; G06Q 10/20
USPC .......................... 710/15, 19, 33, 62, 104, 113
See application file for complete search history.

(56) References Cited

U.S. PATENT DOCUMENTS

| | | | | |
|---|---|---|---|---|
| 7,606,679 | B1 * | 10/2009 | Voicu ..................... | H05B 45/58 702/183 |
| 8,565,067 | B2 * | 10/2013 | Beeston .............. | G06F 11/0793 370/216 |
| 2001/0029529 | A1 * | 10/2001 | Tachibana ........... | G06F 11/0748 714/E11.173 |
| 2004/0117159 | A1 | 6/2004 | Shimizu et al. | |
| 2008/0201501 | A1 * | 8/2008 | Partani .................... | H04L 41/04 710/63 |
| 2010/0262863 | A1 * | 10/2010 | Hess ................... | G06F 11/0793 714/E11.169 |

(Continued)

FOREIGN PATENT DOCUMENTS

| | | |
|---|---|---|
| CN | 115391075 | 11/2022 |
| CN | 116010156 | 4/2023 |
| TW | I698741 | 7/2020 |

OTHER PUBLICATIONS

"Office Action of Taiwan Counterpart Application", issued on Jan. 26, 2024, p. 1-p. 8.

*Primary Examiner* — Idriss N Alrobaye
*Assistant Examiner* — Henry W Yu
(74) *Attorney, Agent, or Firm* — JCIPRNET

(57) ABSTRACT

The disclosure provides a remote maintenance system and an operation method thereof. The remote maintenance system includes a to-be-maintained device and an electronic device. The electronic device is coupled to the to-be-maintained device. The to-be-maintained device has a communication interface. In response to anomaly in the to-be-maintained device, the electronic device connects with a remote device through execution of an application, and the remote device performs remote maintenance on the to-be-maintained device through execution of a maintenance application.

12 Claims, 4 Drawing Sheets

(56)  References Cited

U.S. PATENT DOCUMENTS

| | | | |
|---|---|---|---|
| 2011/0271027 A1* | 11/2011 | Wee ...................... | G06F 13/102 |
| | | | 719/321 |
| 2015/0058442 A1* | 2/2015 | Raskin .................. | G06F 3/0619 |
| | | | 709/217 |
| 2020/0133365 A1* | 4/2020 | Muccini .................. | G06F 1/266 |
| 2020/0171900 A1* | 6/2020 | Pampattiwar ............ | B60D 1/64 |
| 2023/0025750 A1* | 1/2023 | Teoh ................... | G06F 11/0727 |

* cited by examiner

REMOTE MAINTENANCE SYSTEM AND OPERATION METHOD THEREOF

CROSS-REFERENCE TO RELATED APPLICATION

This application claims the priority benefit of Taiwan application serial no. 112129016, filed on Aug. 2, 2023. The entirety of the above-mentioned patent application is hereby incorporated by reference herein and made a part of this specification.

BACKGROUND

Technical Field

The disclosure relates to remote maintenance technology, specifically to a remote maintenance system and an operation method thereof to reduce maintenance cost.

Description of Related Art

Baseboard Management Controller (BMC) provides management and remote monitoring of server host system. The BMC notifies an administrator of anomaly in server host by sending an anomaly message for the administrator to perform remote maintenance in accordance with the previously mentioned anomaly message. The administrator is no longer required to physically connect with the server to perform maintenance tasks. Hence, costs of labor and time in maintenance are reduced.

However, for consumer laptops or personal computers that are not equipped with BMC, remote maintenance cannot be performed unless operating systems (processors) therein are functional. Otherwise, the consumer laptop or personal computer users are compelled to take their laptops or computers to maintenance service centers for maintenance. It is tremendously time-consuming and costly.

SUMMARY

The disclosure provides a remote maintenance system and an operation method thereof to reduce maintenance cost for a to-be-maintained device without BMC, i.e., a consumer laptop or a personal computer.

The remote maintenance system according to an embodiment of the disclosure includes a to-be-maintained device and an electronic device. The electronic device is coupled to the to-be-maintained device. The to-be-maintained device has a communication interface. In response to anomaly in the to-be-maintained device, the electronic device connects with a remote device through execution of an application, and the remote device performs remote maintenance on the to-be-maintained device through execution of a maintenance application.

The operation method of remote maintenance system according to an embodiment of the disclosure includes: in response to anomaly in a to-be-maintained device, connecting with a remote device through execution of an application, and performing remote maintenance on the to-be-maintained device through execution of a maintenance application.

In light of the above, through the disclosed remote maintenance system and operation method thereof, anomaly in the to-be-maintained device leads to the electronic device connecting with the remote device. Consequently, an administrator is able to perform remote maintenance tasks on the to-be-maintained device. Maintenance cost of the to-be-maintained device is therefore reduced.

To explicitly elaborate on aforementioned features and advantages of the disclosure, several exemplary embodiments accompanied with relevant figures are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Certain embodiments of this disclosure are described in detail below with relevant figures. For reference elements or symbols throughout the following description, identical elements or symbols across various figure denote identical or similar elements. The embodiments do not represent all envisaged implementations of the disclosure and should be deemed as exemplary, not exhaustive. More specifically, the embodiments merely illustrate the scope of patent application for this disclosure.

Figure 1:
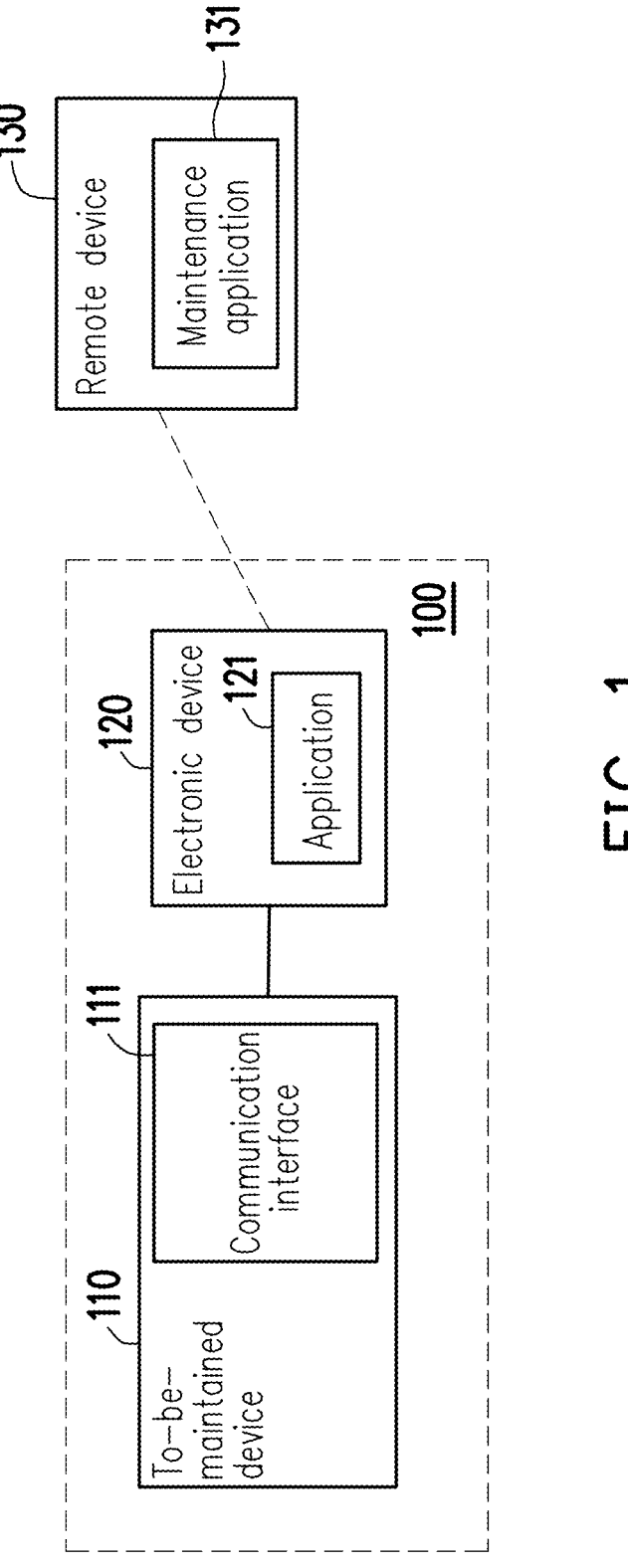
FIG. 1 is a schematic diagram of a remote maintenance system and a remote device, illustrating an embodiment of this disclosure.

FIG. 1 is a schematic diagram of remote maintenance system, illustrating an embodiment of this disclosure. As FIG. 1 indicates, remote maintenance system 100 includes to-be-maintained device 110 and electronic device 120. Electronic device 120 is coupled to to-be-maintained device 110. To-be-maintained device 110 has communication interface 111. For anomaly in to-be-maintained device 110, electronic device 120 connects with remote device 130 through execution of application 121. Specifically, to-be-maintained device 110 connects with an external device, e.g., electronic device 120, via communication interface 111. For anomaly in to-be-maintained device 110, e.g., booting failure or black screen, an user notifies an administrator of the anomaly in to-be-maintained device 110 by connecting electronic device 120 with to-be-maintained device 110 and opening application 121 in electronic device 120 to connect with the administrator's remote device 130.

Remote device 130 executes remote maintenance on to-be-maintained device 110 through execution of maintenance application 131. Specifically, the administrator learns about the anomaly in to-be-maintained device 110 and connects to application 121 through maintenance application 131. From application 121, the user learns about that the administrator is connected. Subsequently, the administrator performs remote maintenance on to-be-maintained device 110 through maintenance application 131, while the user learns about the current maintenance status from application 121. For anomaly in software or firmware of to-be-maintained device 110, the administrator simply fixes to-be-maintained device 110 by performing remote maintenance. Alternatively, for hardware malfunction or other anomaly issues of to-be-maintained device 110 that cannot be fixed by performing remote maintenance, the administrator may provide the user with further instructions. For example, the administrator may advise the user to visit maintenance service center(s) in the user's vicinity and provide remote maintenance logs.

In an embodiment, the administrator fetches product information or hardware serial number of to-be-maintained device 110 through application 121. Specifically, after fetching the product information or the hardware serial number, the administrator obtains corresponding warranty data and purchaser information from a sales database to authenticate the connected user as the legitimate user. Security of maintenance tasks is therefore enhanced.

For anomaly in to-be-maintained device 110, the user connects with remote device 130 through electronic device 120, enabling the administrator to perform remote maintenance on to-be-maintained device 110 through remote device 130. Thus, maintenance cost of to-be-maintained device 110 is reduced.

Figure 2:
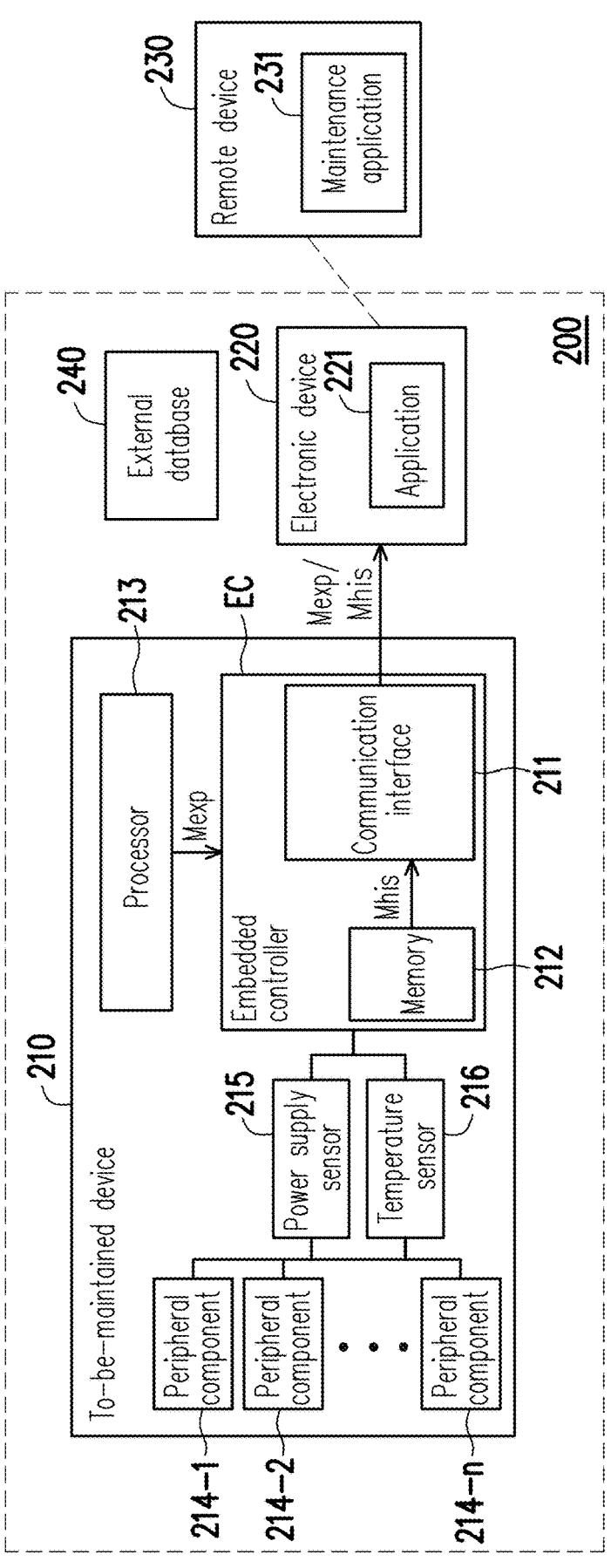
FIG. 2 is a schematic diagram of a remote maintenance system and a remote device, illustrating an embodiment of this disclosure.

FIG. 2 is a schematic diagram of remote maintenance system and remote device, illustrating an embodiment of this disclosure. As FIG. 2 indicates, remote maintenance system 200 includes to-be-maintained device 210, electronic device 220, and external database 240. Electronic device 220 is coupled to to-be-maintained device 210. To-be-maintained device 210 includes embedded controller EC, processor 213, peripheral components 214-1~214-n, power supply sensor 215, and temperature sensor 216. Processor 213 is coupled to embedded controller EC. Embedded controller EC includes communication interface 211 and memory 212. Power supply sensor 215 is coupled to peripheral components 214-1~214-n and embedded controller EC. Temperature sensor 216 is coupled to peripheral components 214-1~214-n and embedded controller EC.

In an embodiment, communication interface 211 is a Universal Serial Bus (USB) interface, e.g., USB Type-C interface. Embedded controller EC is coupled to electronic device 220 via communication interface 211. For anomaly in to-be-maintained device 210, an anomaly message Mexp is sent to electronic device 220. Specifically, for anomaly in processor 213, e.g., booting failure or black screen, embedded controller EC sends the anomaly message Mexp to electronic device 220. Embedded controller EC fetches the anomaly message Mexp from processor 213 via Low Pin Count Bus (LPC) interface or enhanced Serial Peripheral Interface (eSPI). Hence, for booting failure or black screen in to-be-maintained device 210, embedded controller EC remains functional instead of being affected by processor 213.

Through Remote Network Driver Interface Specification (RNDIS), electronic device 220 receives the anomaly message Mexp from embedded controller EC. Specifically, RNDIS works atop USB to facilitate network transmission and to further offer network sharing functionality. Electronic device 220 runs application 221. Application 221 communicates with embedded controller EC through RNDIS and connects with maintenance application 231 of remote device 230 via the Internet. Consequently, electronic device 220 functions as an intermediate router between remote device 230 and embedded controller EC. Via network shared by electronic device 220, embedded controller EC connects with the Internet, enabling the administrator to perform remote maintenance on to-be-maintained device 210 through maintenance application 231. For anomaly in software or firmware of to-be-maintained device 210, e.g., updating or restoring Basic Input/Output System (BIOS), the administrator simply fixes to-be-maintained device 210 by performing remote maintenance. Alternatively, for hardware malfunction or other anomaly issues of to-be-maintained device 210 that cannot be fixed by performing remote maintenance, the administrator may provide the user with further instructions. For example, the administrator may advise the user to visit maintenance service center(s) in the user's vicinity and provide remote maintenance logs.

For anomaly in processor 213, embedded controller EC sends anomaly message Mexp to electronic device 220 via communication interface 211. Application 221 communicates with embedded controller EC through RNDIS and connects with remote device 230 via the Internet, enabling the administrator to perform remote maintenance on to-be-maintained device 210 through maintenance application 231. Thus, maintenance cost of to-be-maintained device 210 is reduced.

In an embodiment, external database 240 stores the anomaly message Mexp and remote maintenance logs. Specifically, the administrator analyzes the anomaly issue of to-be-maintained device 210 by using data stored by external database 240. Accountability of subsequent remote maintenance is therefore boosted.

In an embodiment, memory 212 stores a message of history status Mhis of to-be-maintained device 210. For anomaly in to-be-maintained device 210, electronic device 220 receives the message of history status Mhis via communication interface 211 and sends the message of history status Mhis to remote device 230. Specifically, the administrator traces history status of to-be-maintained device 210 with the message of history status Mhis. Accuracy and efficiency of remote maintenance are therefore enhanced.

Power supply sensor 215 generates power supply status information, while temperature sensor 216 generates temperature status information. By receiving the power supply status information and the temperature status information, embedded controller EC fetches message of history status Mhis of to-be-maintained device 210. Peripheral components 214-1~214-n may be fans, keyboards, mice, or memory. Power supply sensor 215 detects battery status of peripheral components 214-1~214-n, while temperature sensor 216 detects temperature status of peripheral components 214-1~214-n. For anomaly in peripheral components 214-1~214-n, memory 212 of embedded controller EC stores the power supply status information and the temperature status information of peripheral components 214-1~214-n in order to fetch the message of history status Mhis of peripheral components 214-1~241-n. Subsequently, for anomaly in processor 213, embedded controller EC sends the message of history status Mhis to electronic device 220. Electronic device 220 sends the message of history status Mhis to remote device 230. Hence, with the message of history status Mhis, the administrator traces anomaly status history of peripheral components 214-1~214-n. Thus, accuracy and efficiency of remote maintenance are enhanced.

Figure 3:
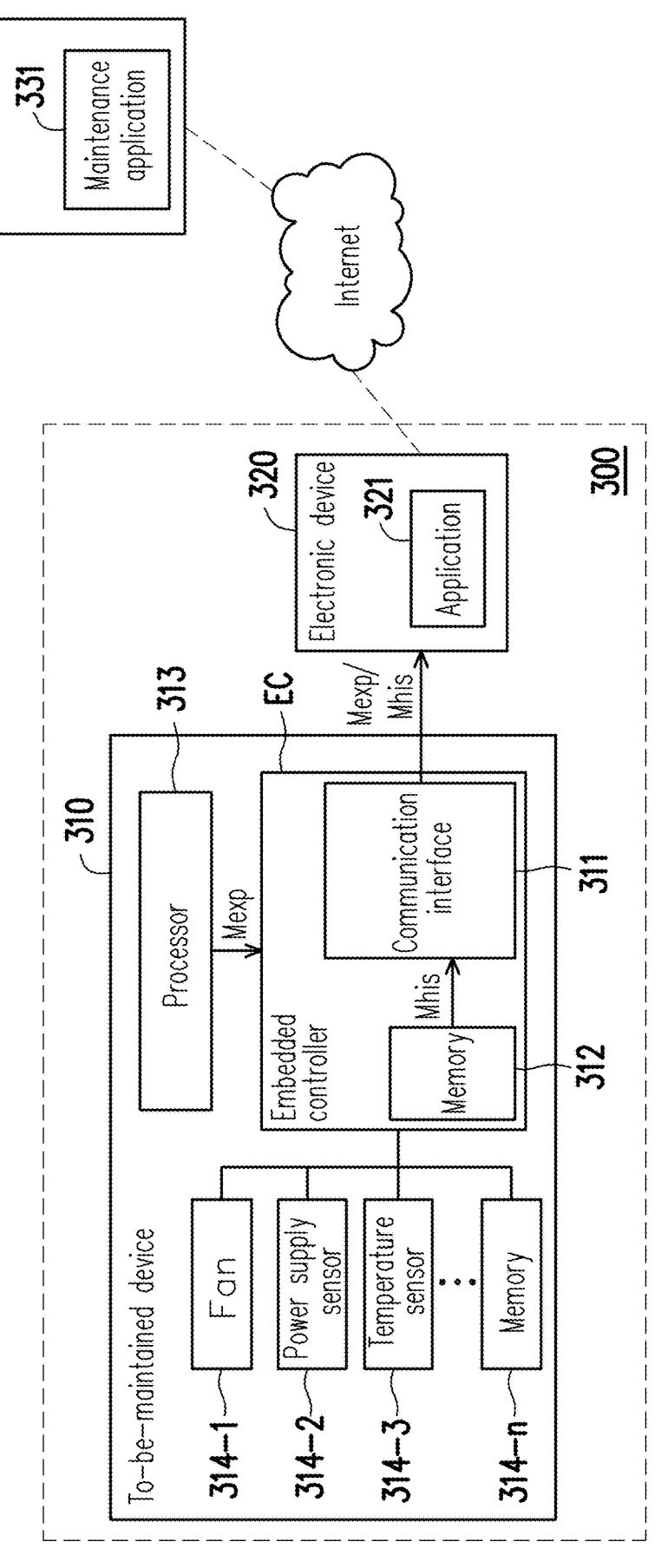
FIG. 3 is a schematic diagram of a remote maintenance system and a remote device, illustrating an embodiment of this disclosure.

FIG. 3 is a schematic diagram of remote maintenance system and remote device, illustrating an embodiment of this disclosure. As FIG. 3 indicates, remote maintenance system 300 includes to-be-maintained device 310 and electronic device 320. Electronic device 320 is coupled to to-be-maintained device 310. To-be-maintained device 310 includes embedded controller EC, processor 313, fan 314-1, power supply sensor 314-2, temperature sensor 314-3, and memory 314-n. Processor 313 is coupled to embedded controller EC. Embedded controller EC includes communication interface 311 and memory 312. Embedded controller EC is coupled to fan 314-1, power supply sensor 314-2, temperature sensor 314-3, and memory 314-n.

For anomaly in processor 313, e.g., booting failure or black screen, embedded controller EC fetches the anomaly message Mexp from processor 313 through Low Pin Count Bus (LPC) interface or enhanced Serial Peripheral Interface (eSPI).

Communication interface 311, e.g., USB interface, subsequently sends the anomaly message Mexp to electronic device 320 through RNDIS. Specifically, application 321 communicates with embedded controller EC through RNDIS and connects with application 331 of remote device 330 via the Internet, enabling the administrator to perform remote maintenance on to-be-maintained device 310 through maintenance application 331. For anomaly in software or firmware of to-be-maintained device 310, the administrator simply fixes to-be-maintained device 310 by performing remote maintenance. Alternatively, for hardware malfunction or other anomaly issues of to-be-maintained device 310 that cannot be fixed by performing remote maintenance, the administrator may provide the user with further instructions. For example, the administrator may advise the user to visit maintenance service center(s) in the user's vicinity and provide remote maintenance logs.

For anomaly in to-be-maintained device 310, the user connects with remote device 330 through electronic device 320, enabling the administrator to perform remote maintenance on to-be-maintained device 310 through remote device 330. Thus, maintenance cost of to-be-maintained device 310 is reduced.

In an embodiment, memory 312 stores the message of history status Mhis of to-be-maintained device 310. Specifically, via Inter-Integrated Circuit (I2C) interface, embedded controller EC connects with power supply sensor 314-2 or temperature sensor 314-3 to fetch power supply status information or temperature status information of to-be-maintained device 310. Embedded controller EC receives Pulse Width Modulation (PWM) signals related to controlling fan 314-1 in order to monitor spinning speed of fan 314-1. Via Serial Peripheral Interface (SPI), embedded controller EC connects with memory 314-n to fetch internal messages in memory 314-n. In accordance with the power supply status information, the temperature status information, the PWM signals, or internal signals, embedded controller EC fetches messages of history Mhis of fan 314-1, power supply sensor 314-2, temperature sensor 314-3, or memory 314-n. For anomaly in processor 313, embedded controller EC sends the message of history status Mhis stored by memory 312 to electronic device 320. Electronic device 320 sends the message of history status Mhis to remote device 330. With the message of history status Mhis, the administrator traces history status of fan 314-1, power supply sensor 314-2, temperature sensor 314-3, or memory 314-n. Accuracy and efficiency of remote maintenance are therefore enhanced.

Figure 4:
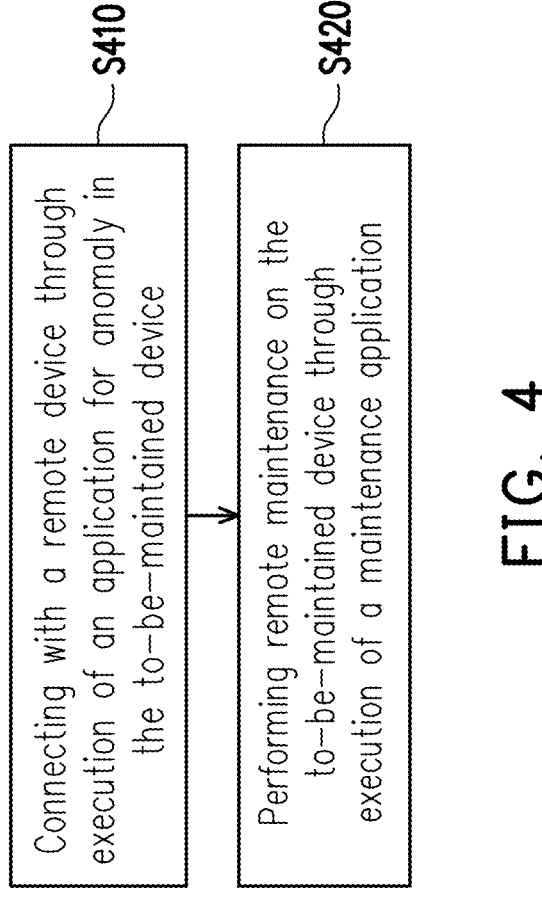
FIG. 4 is a flowchart of an operation method of remote maintenance system, illustrating an embodiment of this disclosure.

FIG. 4 is a flowchart of an operation method of remote maintenance system, illustrating an embodiment of this disclosure. Operation method in this embodiment is executed in remote maintenance 100 indicated in FIG. 1. Refer to FIG. 1 and FIG. 4. In step S410, for anomaly in to-be-maintained device 110, electronic device 120 connects with remote device 130 through execution of application 121. In step S420, remote device 130 performs remote maintenance on to-be-maintained device 110 through execution of application 131. Relevant practices involved in step S410 and step S420 have been described in detail in the previously mentioned embodiments and are therefore intentionally omitted.

In light of the above, through the disclosed remote maintenance system and operation method thereof, the anomaly message is sent to the electronic device via communication interface in response to anomaly in the processor. Subsequently, the application communicates with the embedded controller and the remote device, enabling the administrator to perform remote maintenance on the to-be-maintained device by using the maintenance application. Thus, maintenance cost of the to-be-maintained device is reduced. The remote device also traces anomaly status of the to-be-maintained device in accordance with the message of history status. Accuracy and efficiency of remote maintenance are therefore enhanced. The anomaly issue of the to-be-maintained device is analyzed in accordance with the anomaly message stored by the external database and also with the remote maintenance logs. Hence, accountability of subsequent remote maintenance is boosted.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A remote maintenance system, comprising:
   a to-be-maintained device, which has a communicative interface; and
   an electronic device, structurally separate from and externally coupled to the to-be-maintained device via the communicative interface,
   wherein in response to anomaly in the to-be-maintained device, the electronic device connects with a remote device through execution of an application, and the remote device performs remote maintenance on the to-be-maintained device through execution of a maintenance application,
   wherein the to-be-maintained device comprises:
   an embedded controller, coupled to the electronic device via the communication interface, wherein in response to anomaly in the to-be-maintained device, the embedded controller sends an anomaly message to the electronic device; and
   a processor, coupled to the embedded controller,
   wherein in response to anomaly in the processor, the embedded controller sends the anomaly message to the electronic device,
   wherein the embedded controller fetches the anomaly message from the processor through one of a Low Pin Count Bus interface and an enhanced Serial Peripheral Interface.

2. The remote maintenance system according to claim 1, wherein the embedded controller further comprises:
   memory, configured to store a message of history status of the to-be-maintained device,
   wherein in response to anomaly in the to-be-maintained device, the electronic device further receives the message of history status via the communication interface and sends the message of history status to the remote device.

3. The remote maintenance system according to claim 1, further comprising:

an external database configured to store the anomaly message and maintenance logs of the remote maintenance.

4. The remote maintenance system according to claim 1, wherein the communication interface is a USB interface.

5. The remote maintenance system according to claim 1, wherein the electronic device receives the anomaly message from the embedded controller through Remote Network Driver Interface Specification.

6. The remote maintenance system according to claim 1, wherein the to-be-maintained device further comprises:

a plurality of peripheral components;

a power supply sensor, coupled to the plurality of peripheral components and the embedded controller and configured to generate power supply status information; and a temperature sensor, coupled to the plurality of peripheral components and the embedded controller and configured to generate temperature status information, wherein the embedded controller receives the power supply status information and the temperature status information to fetch the message of history status of the to-be-maintained device.

7. An operation method of remote maintenance system, the remote maintenance system comprises a to-be-maintained device and an electronic device, wherein the to-be-maintained device has a communication interface, and the electronic device is structurally separate from and externally coupled to the to-be-maintained device via the communicative interface, the operation method comprising:

in response to anomaly in a to-be-maintained device, connecting, by the electronic device, with a remote device through execution of an application and performing remote maintenance on the to-be-maintained device through execution of a maintenance application, in response to anomaly in the to-be-maintained device, sending, by an embedded controller of the to-be-maintained device, an anomaly message to the electronic device via the communication interface, wherein in response to anomaly in a processor of the to-be-maintained device, sending, by the embedded controller, the anomaly message to the electronic device, wherein fetching, by the embedded controller, the anomaly message from the processor via one of a Low Pin Count Bus interface and an enhanced Serial Peripheral Interface.

8. The operation method according to claim 7, further comprising:

in response to anomaly in the to-be-maintained device, receiving a message of history status from memory via the communication interface and sending the message of history status to the remote device.

9. The operation method according to claim 7, further comprising:

storing the anomaly message and maintenance logs of the remote maintenance through an external database.

10. The operation method according to claim 7, wherein the communication interface is a USB interface.

11. The operation method according to claim 7, wherein the electronic device receives the anomaly message through Remote Network Driver Interface Specification.

12. The operation method according to claim 7, further comprising:

generating power supply status information in correspondence to a plurality of peripheral components through a power supply sensor;

generating temperature status information in correspondence to the plurality of peripheral components through a temperature sensor; and receiving the power supply status information and the temperature status information to fetch the message of history status of the to-be-maintained device.

* * * * *